United States Patent [19]

Tanabe et al.

[11] Patent Number: 5,124,748
[45] Date of Patent: Jun. 23, 1992

[54] PICTURE IMAGE PROCESSING SYSTEM

[75] Inventors: Eiichi Tanabe; Yuji Hikawa, both of Kanagawa, Japan

[73] Assignee: Fuji Xerox Co., Ltd., Tokyo, Japan

[21] Appl. No.: 594,969

[22] Filed: Oct. 10, 1990

[51] Int. Cl.$^5$ .............................................. G03G 15/00
[52] U.S. Cl. .................................. 355/200; 355/203; 355/133; 101/DIG. 37
[58] Field of Search ............... 355/203, 204, 200, 209, 355/133, 202, 210; 101/DIG. 37

[56] References Cited

U.S. PATENT DOCUMENTS

| | | | |
|---|---|---|---|
| 4,757,348 | 7/1988 | Rourke et al. | 355/200 |
| 4,970,554 | 11/1990 | Rourke | 355/202 |
| 4,987,447 | 1/1991 | Ojha | 355/204 |

Primary Examiner—R. L. Moses
Attorney, Agent, or Firm—Finnegan, Henderson, Farabow, Garrett and Dunner

[57] ABSTRACT

The picture image processing system disclosed in the present invention comprises a control number assigning means, a job reservation means, a control information storing means, and an output means, which yields the output of paper with at least some part of the control information printed thereon together with the control number, and this system may further comprise a reservation result recognizing means and an output means constructed in such a manner as to be capable of producing the output of the status of the reserved jobs printed thereon together with the control number, the information thus printed out being at least either one of the two types, characters and geometrical patterns, which may be made selectable by either a difference in the input equipment or the result of a processing job or both of these, with the possible addition of the capability of controlling the printing position for the characters or geometrical patterns. Thus, the picture image processing system outputs the output paper with the job results, the type of the input equipment, and so forth printed thereon, thereby partitioning off the individual jobs with a clear distinction made between the partitioning sheet and the other output paper, which offers enhanced visual recognition for the operator's benefit.

4 Claims, 4 Drawing Sheets

PICTURE IMAGE PROCESSING SYSTEM

BACKGROUND OF THE INVENTION

1. Field of the Invention

The present invention relates to a picture image processing system for sorting output sets. The system is capable of executing a plurality of output operations even if the equipment operator is absent.

2. Discussion of the Related Art

Some of the existing copying machines discharge a partitioning sheet, for example, a colored paper sheet, into a particular tray to indicate every job unit as specified by the operator or to mark off every set of copies during copying operations for producing a plurality of sets of copies. Such a partitioning sheet is nothing more than a marker. Also, some printers and facsimile machines discharge a kind of partitioning sheet, which serves as a header indicating the job attributes of the output which follows the header. Thus, the partitioning sheet merely contains some part or the entirety of the transmitted data printed thereon.

Conventional picture image processing equipment is capable of producing the data output from a plurality of types of input equipment (multiple function machines), but there has been no partitioning sheet which offers a unified format and indicates the attributes of the paper or the results of the executed operations. In these circumstances, the conventional equipment presents the problem that the sheets of output paper tend to get mixed up in the output tray. Consequently, an operator may inadvertently commingle sheets of output paper produced for several people or may not become aware of the fact that the desired output paper has not been produced.

SUMMARY OF THE INVENTION

The present invention has been made in view of the above circumstances and has as an object of a picture image processing system capable of providing the output of a partitioning sheet which clearly indicates the attributes of the output paper and/or the results of a processing operation.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

In order to achieve the objects set forth hereinabove and in accordance with the purpose of the invention as embodied and broadly described herein, the picture image processing system according to the present invention which produces output picture information by performing picture image processing operations on input picture information fed from a plurality of different input devices comprises a control number assigning means for assigning self-initiated control numbers to the picture image processing operations, a process-reserving means for reserving one or more of the processes other than the process being executed, a control information accumulating means for accumulating control information relating to the processes, and an output means for outputting paper with at least some of the accumulated control information the control number printed thereon together with the control number defined above.

In an embodiment of system designed to output the result of a reservation upon completion of a reserving process, the picture image processing system according to the present invention is provided further with a reservation result recognizing means to determine the result of a reservation processing operation and a result output means for outputting paper with at least the result of the determined reservation processing printed thereon along with the accumulated control information and the control number.

BRIEF DESCRIPTION OF THE DRAWINGS

The accompanying drawings, which are incorporated in and constitute a part of this specification illustrate embodiments of the present invention and, together with the description, serve to explain the objects, advantages and principles of the invention.

In the drawings:

FIG. 4 illustrates an example of the format for an output sheet for a job finished by the image processing system of the present invention in a normal manner; within this figure.

DETAILED DESCRIPTION OF THE INVENTION

Figure 1:
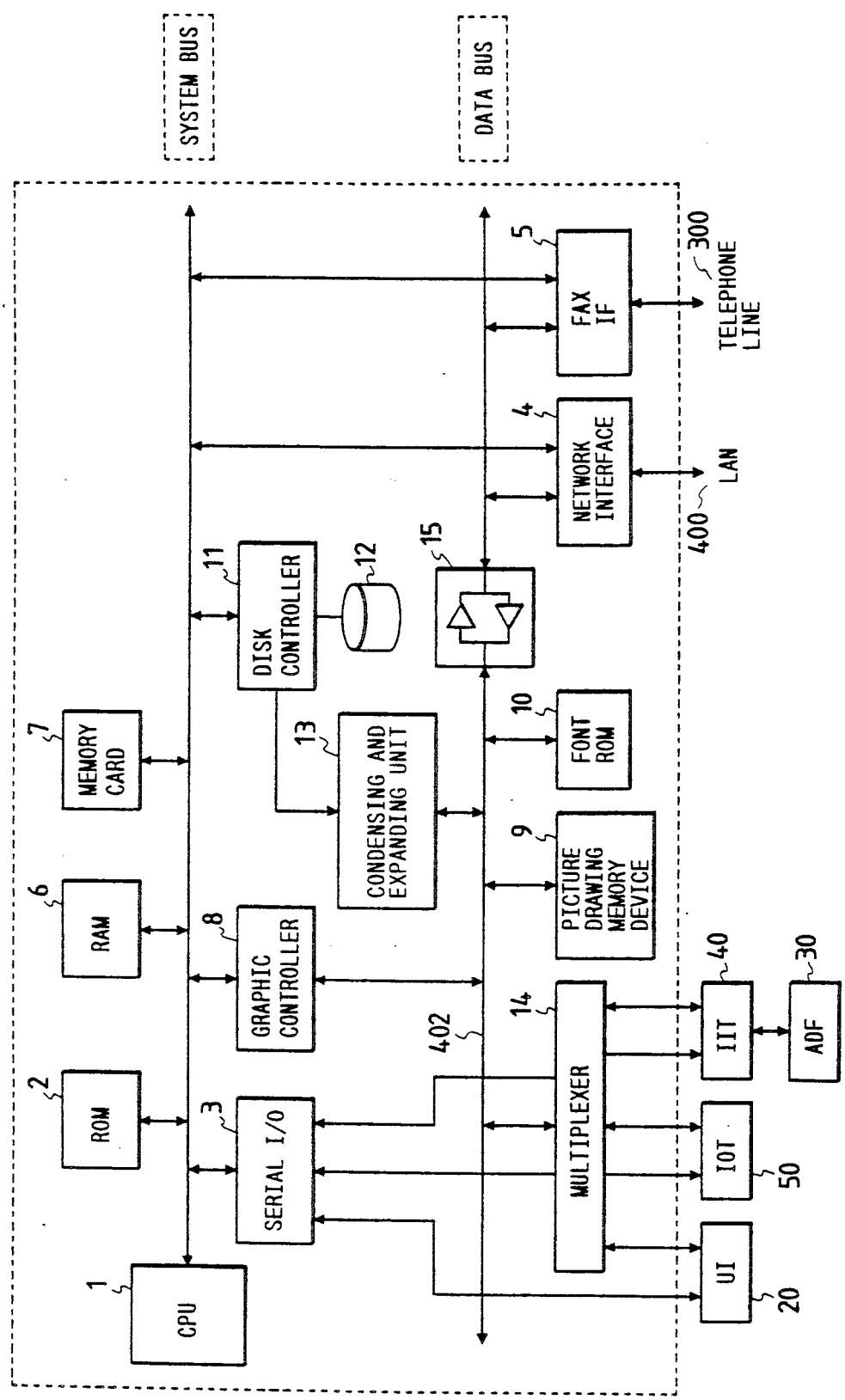
FIG. 1 is a block diagram illustrating a picture image processing system using a paper user interface according to the present invention.

During execution of a plurality of processes, the picture image processing system assigns self-initiated control numbers to the processes just mentioned. When the execution of the above-mentioned process is started or finished, the system prints out on a paper at least some part of the accumulated control information, such as the number of sheets in the original document and the number of copies together with the control number mentioned above. Above all, if the paper is printed out with information based on the result as of the time of the completion of the processing operation, it is possible to determine the status of the processing jobs indicated by the individual control numbers as being executed, interrupted, or finished, since the processing of reservations is controlled by the control numbers. Thus, the system determines, at the time of the completion of a reserved process, whether the particular processing job has been completed without any trouble or whether it has been terminated or suspended in an abnormal state. Depending on the result of this determination, the system prints out a message explaining the circumstances and thereby notifies the user of the operating status.

The printed information mentioned above is characterized in that it comprises characters and/or geometrical patterns. Also, the characters or geometrical patterns thus printed are selected based on either differences in the input equipment used or the result of the execution of a processing operation or on both of these factors. Moreover, the positions for printing the characters or geometrical patterns are easily controlled.

Some examples of preferred embodiments of the present invention are described below with reference to the accompanying drawings, in which like reference characters designate like or corresponding parts throughout the several drawings.

FIG. 1 is a block diagram illustrating a picture image processing system using a paper user interface according to the present invention. A central processing unit (CPU) 1 produces output picture information by performing picture image processing operations on the basis of the input picture information received from various types of input equipment. The CPU 1 executes control programs stored in the read only memory device (ROM) 2, and outputs output picture information by means of the recording block (Image Output Terminal: IOT) 50 of this picture image processing system or to another picture image processing system via a network line LAN 400 or to a facsimile machine via a telephone line 300.

The input picture information includes instructions for machine operations as defined on a job control sheet and picture information obtained from an original document. The output picture information contains the output picture information from the job control sheet, as modified, in addition to the output picture image information obtained from the original document.

The input equipment includes user interfaces (UI) 20 such as a control panel, a keyboard, and a mouse for the picture image processing system, a picture image reading block (Image Input Terminal: IIT) 40, which reads a stack of original documents (hereinafter called "a batch") along with a job control sheet which are placed together in the automatic document feeder (ADF) 30, and various other picture image processing devices (not illustrated in the Figure) which are connected to this system via a network line 400, a telephone line 300, or the like.

Input picture information read from a job control sheet is sent to the CPU 1 via a serial I/O lns and interfaces (IF) 4 and 5. The CPU 1 recognizes the information indicated by sheet detecting marks regarding such items as the direction in which the original document is fed along with job attributes such as the size and number of sheets of paper and the destination of the processed document. The determinate information on the attributes of the job is then stored, together with the identification (ID) information for the job, in a backup RAM 6 or on a memory card 7.

A graphic controller 8 begins operating at the same time. By executing a format generating task stored in the ROM 2 the graphic controller 8 draws picture images on a picture drawing memory device 9 based on the input picture information sent to the data bus 402 through a multiplexer 14 or based on the input picture information sent to the data bus 402 through interfaces 4 and 5 and a gate 15. The graphic controller 8 also generates the image pattern indicated on the job control sheet, while reading the characters from a font ROM 10. Graphic controller 8 functions in the same manner on the input picture information obtained from an original document, and an image pattern representing the original document is generated on the picture drawing memory device 9.

A generated image pattern is accumulated in the form of picture image data stored on a hard disk 12 whenever required. A disk controller 11 performs compressing and expanding processes in a compressing and expanding unit 13 to compress the picture image data generated in this system as well as the picture image data which has been transmitted from other picture image processing equipment, and also extends the picture image data accumulated in the condensing and expanding unit 13 and feeds the extended picture image data to the data bus 402.

Figure 2:
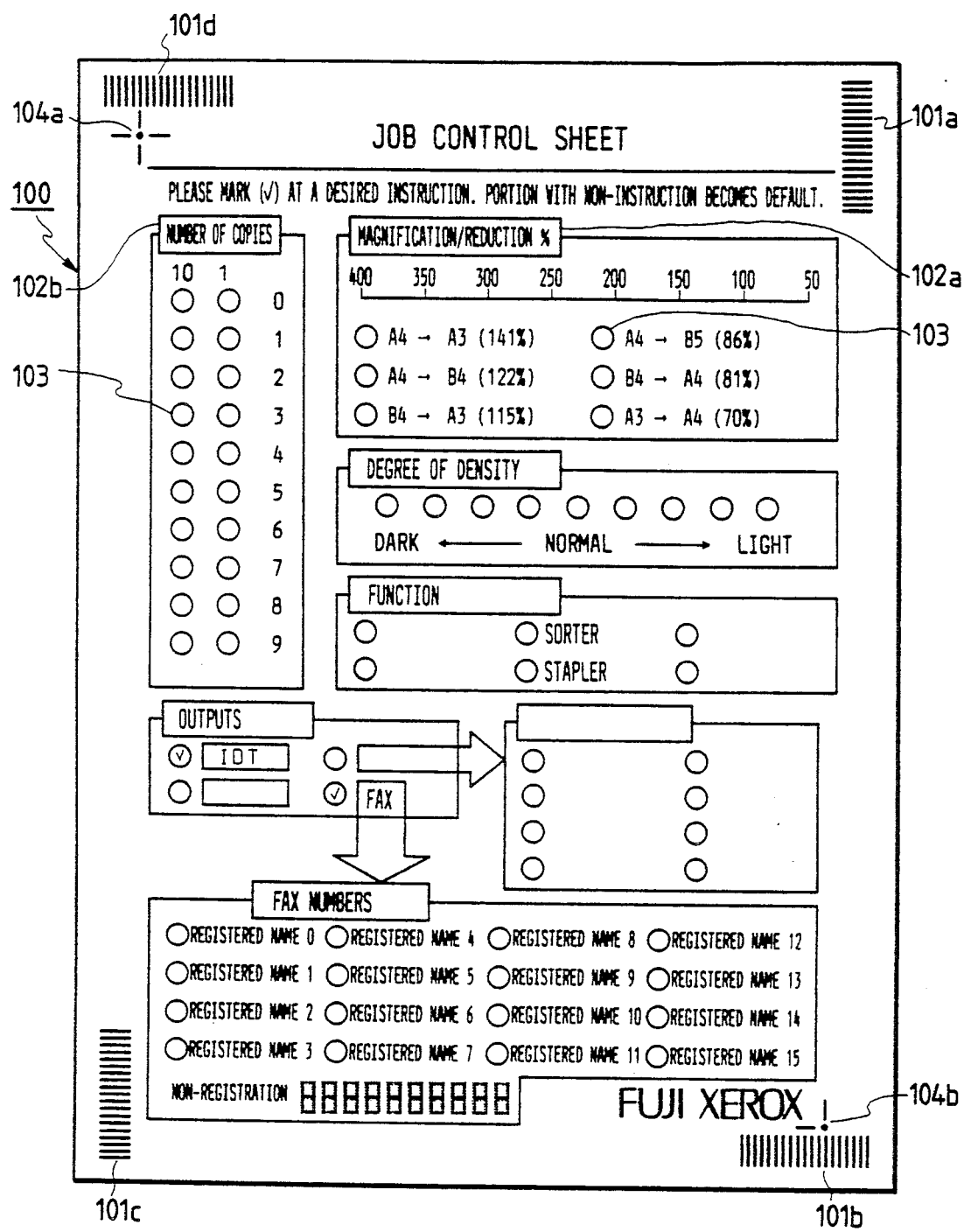
FIG. 2 illustrates an example of a job control sheet.

The following is a description of the job control sheet illustrated in FIG. 2. The job control sheet 100 has sheet detecting marks 101 (a to d) arranged in the four corners thereof and in points which have symmetrical relationship representing different attributes of the sheet, as illustrated in FIG. 2. The job control sheet also has a job control instruction block 102 (a, b, . . . ) with entry columns 103 for indicating the attributes of a job being provided on the inner side of the marks.

Because the sheet detecting marks 101 are arranged in the four corners of the sheet, it is possible to identify the attributes of the sheet immediately after the start of a scanning operation. Because the marks are symmetrically arranged, it is also possible to read the sheet in any direction. That is, the individual marks have an attribute with different information indicating the scanning direction, such as the vertical forward direction, the vertical reverse direction, the horizontal forward direction, and the horizontal reverse direction. Also, job control instruction block 102 is provided with originating points 104a and 104b of the picture image coordinates necessary for the recognition of the sheet. The originating points provided in this manner make it possible to properly handle the job control sheet even if it is skewed.

A description is now provided of the functions of the job control sheet.

Figure 3:
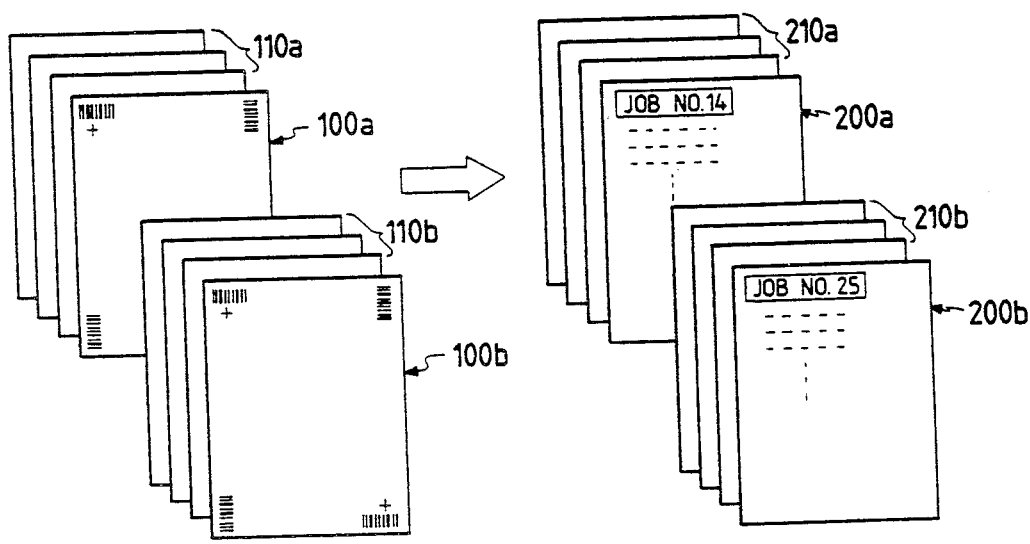
FIG. 3 schematically illustrates the flow of batch processing.

The user checks the required jobs, indicating the appropriate items by deleting or entering an X-mark, for example, in the check columns 103 on the job control sheets. The user then places these job control sheets 100a and 100b over the original documents 110a and 110b, as shown in FIG. 3. This batch of original documents is then stacked in the automatic document feeder (ADF). Next, the original document batch is transported to the picture image reading block (the Image Input Terminal: IIT) in accordance with the instructions given on the job control sheet. The picture image reading block (IIT) converts the picture images on the original document or those on the job control sheet into electrical signals, i.e., input picture information. The information thus obtained is stored, using the multiplexer, in the picture drawing memory device 9. The CPU 1 identifies the sheet detecting marks in the input picture information. If the CPU 1 finds that the picture images presently being scanned are those on the job control sheets, the operation for recognizing the requirements of the job indicated on the job control sheets is performed.

In this regard, the operation for recognizing the particulars of the job is not performed during the processing of any original document other than a job control sheet. Next, the CPU 1 searches the originating points for the picture image coordinates based on the attributes identified by reference to the sheet detecting marks. The CPU then begins the recognition of the details of the job on the basis of the originating points and the numbers. In the hard disk, look-up tables (LUT), which are suitable for the recognition of the requirements of the individual jobs with reference to their numbers, are provided in advance for reference wit respect to the job control sheets. These look-up tables (LUT) define what jobs are to be performed on the images on the job control sheet itself and on the coordinates in the user check column. The operation for the recognition of the requirements of a job first causes the relative coordinates to be located from the originating points of the picture image coordinates with respect to the points marked by the user's checks and then identifies the job by searching the appropriate LUT on the basis of the relative coordinates. Thereafter, the determinate job is executed on the original document which follows the job control sheet. For example, if a determinate job is to be produced as output from the system itself, the picture image data of the original document is read from the picture drawing memory device 9, and output paper sheets 210a and 210b are produced as output, along with partitioning sheets 200a and 200b having information such as the job results printed thereon, from the recording block i.e. the Image Output Terminal (IOT). If the picture image data is to be produced as output via a facsimile machine or to be processed at a work station in another system, the output picture information is transmitted by operating the respective interfaces.

A description of the preferred embodiments follows.

When the CPU 1 receives a command/status signal from an input device, it provides a number on a counter, which is cleared when the power is turned on, and assigns the number on the counter as a control number. This control number is displayed to the operator through a user interface UI, such as a cathode ray tube (CRT) unit. The subsequent processing operations are controlled by this control number, which serves as a common label to be used by the operator throughout the entire course of the operations. In this regard, the processing operations from input to accumulation and then to output will not be executed sequentially if the system has a plurality of input equipment devices, to maximize the efficiency of the system. At the same time, the picture image data is produced as an output directly from the picture drawing memory to the recording block (IOT), without storing the picture image data in the hard disk if the picture image data will not be used again.

With regard to the output operations described above, the CPU 1 can determine the status of the processing jobs under the individual control numbers which are being executed or interrupted or finished by using the commands and/or status information which the CPU 1 receives from the graphic controller, the disk controller, the input and output interfaces, the recording block (IOT), and so forth. Then, when a completion command has been received, the CPU 1 evaluates the status of the jobs at any given point in time and determines whether the particular processing job has been satisfactorily completed or has instead been terminated in an abnormal state. Depending on the result of this evaluation, the CPU 1 activates the graphic controller to read the necessary control information, such as messages and patterns out of the backup RAM, to develop the information in the page memory device, and thereafter to discharge the partitioning sheet from the recording block (IOT).

Figure 4A:
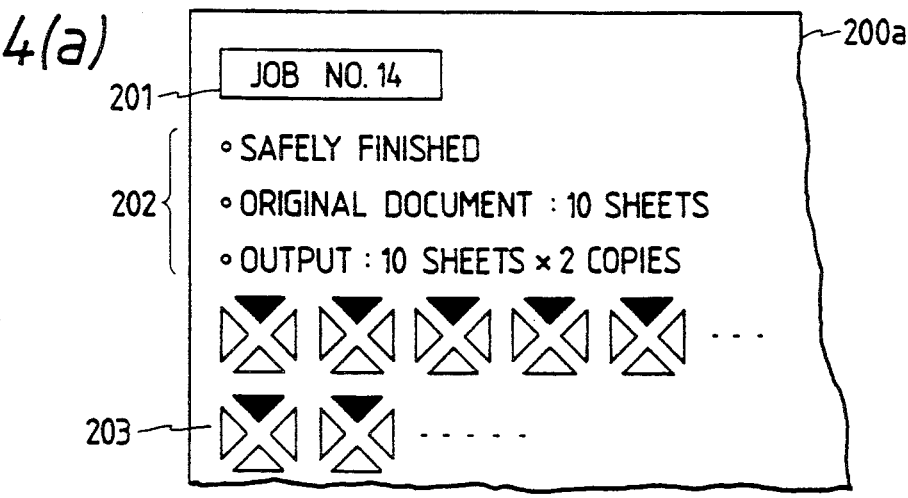
FIG. 4(a) illustrates the output paper of a job produced by means of a reading block.
Figure 4B:
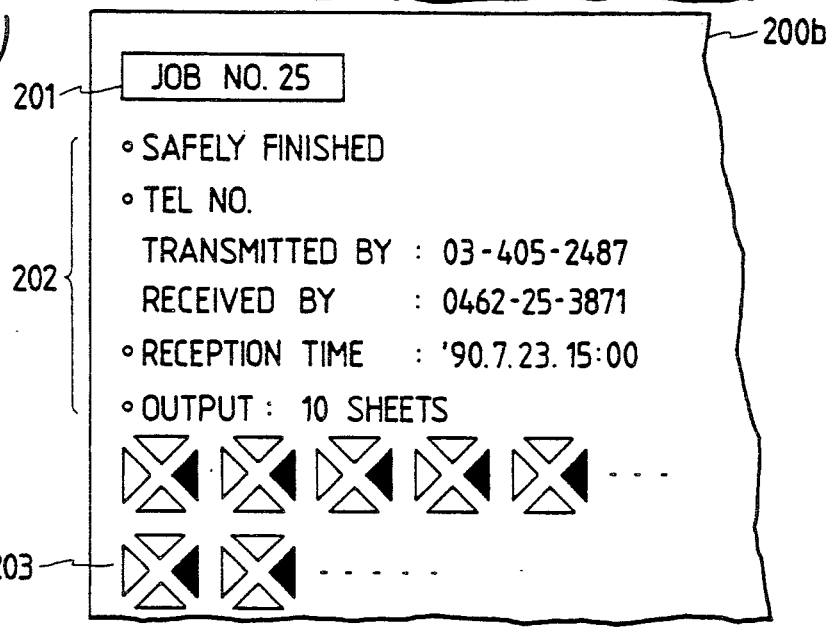
FIG. 4(b) illustrates the output paper produced by a job using a facsimile machine.
Figure 4C:
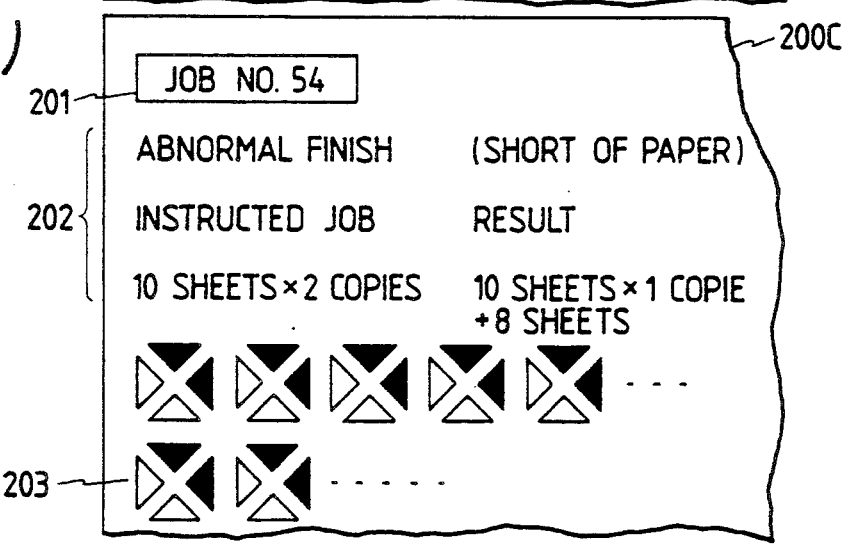
FIG. 4(c) illustrates an example of the format for the output paper produced if a job is abnormally terminated.

The partitioning sheet 200a which is illustrated in FIG. 4(a) displays the information printed on it, together with the control number 201, to the effect that the input from the reading block has been processed under the control number "14" and completed satisfactorily after the output of two copies of ten sheets of the original document. Also, the partitioning sheet 200b shown in FIG. 4(b) displays the information printed thereon indicating that the processing job has been properly finished as required by the control number "25" using the picture image information input from the facsimile machine. Partitioning sheet 200c bears the printed message 202 which indicates that the job processed under the control number "54" has been interrupted during its processing because the paper has run short.

These partitioning sheets have a pattern 203 printed on each of them to enable the operator to determine the input equipment from which the particular job has been received or to determine whether the job has been performed properly. For example, a mosaic pattern composed of four triangles arranged with their apexes directed to the center of the pattern formation serves as an indicator clearly identifying the origin and status of a job by the positions and number of the triangles.

In this preferred embodiment, the system is constructed in such a manner as to output the result of the processing of reserved jobs together with their control numbers. It is also possible within the technical scope of the present invention to utilize the initially set control information regarding such items as the number of copies and the destinations of distribution, i.e., some part of the information input with a job control sheet or the like at the time when processing operations are started on a reserved job.

In this preferred embodiment, the system adds the control information for each unit of processing as instructed by the operator. This system therefore enables the operator to freely choose between the output or non-output of a partitioning sheet by operating the control panel.

This example describes a system which uses as the partitioning sheet the regular paper available in the paper tray for use in the various processes. It is also feasible to set up an additional paper tray to be exclusively used for the partitioning sheets which are indentical in size and different in color.

All of the necessary information is printed on the partitioning sheet in this example, but it is also possible to construct this system so that the operator will be able to set such items freely.

It is also feasible to modify the format of the partitioning sheet and the mosaic pattern thereon, so as to achieve enhanced visual recognition, by means of an editor for editing the picture images (not shown in any of the Figures). It is further possible to have such a format and such a pattern read into the system with the reading block (IIT).

Also, if a job ends up in an abnormal state because of a shortage of output sheets, a failure in stapling or the like, the partitioning sheet can be produced as output to be used as a job control sheet for giving instructions for the remainder of the processing job.

In addition, the position where the control number is indicated may be changed for different types of the input equipment in order to improve visual discrimination.

Furthermore, the information to be printed on the partitioning sheet is stored in the form of condensed data in the backup RAM, but the information may also be stored in the hard disk.

As described hereinabove, a picture image processing system according to the present invention assigns control numbers set up by the system itself and also produces the output paper with the job results, the type of the input equipment, and so forth printed thereon, thereby partitioning the individual jobs. Thus, the partitioning sheet marks a distinct difference from the other output paper, thereby enhancing the visual recognition of the partitioning sheet and the output of each job for the operator's benefit.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A picture image processing system for producing output picture information by performing a plurality of picture image processing jobs on the input picture information received from a plurality of different input devices, wherein the picture image processing system comprises:

control number assigning means for assigning self-initiated control numbers to the plurality of processing jobs;

reservation means capable of accepting one or more reservations for a processing job in addition to a job being performed;

control information storing means for accumulating control information on said processing jobs;

output means for outputting a record with at least a portion of said control information printed thereon together with said control number; and reservation result recognizing means for determining the result of processing operations performed on a reserved job, and wherein said output means outputs paper with at least said result from said processing operations performed on said reserved job printed thereon along with said control information and said control number.

2. A picture image processing system according to claim 1, wherein said output means prints information comprising characters, geometrical patterns, or combinations thereof.

3. A picture image processing system according to claim 2, wherein said characters or geometrical patterns are selectable on the basis of one or both of differences in said input devices and a result of performing a processing job.

4. A picture image processing system according to claim 2, wherein said output means is capable of controlling the position at which said characters or said geometrical patterns are printed.

* * * * *